Patented Sept. 3, 1946

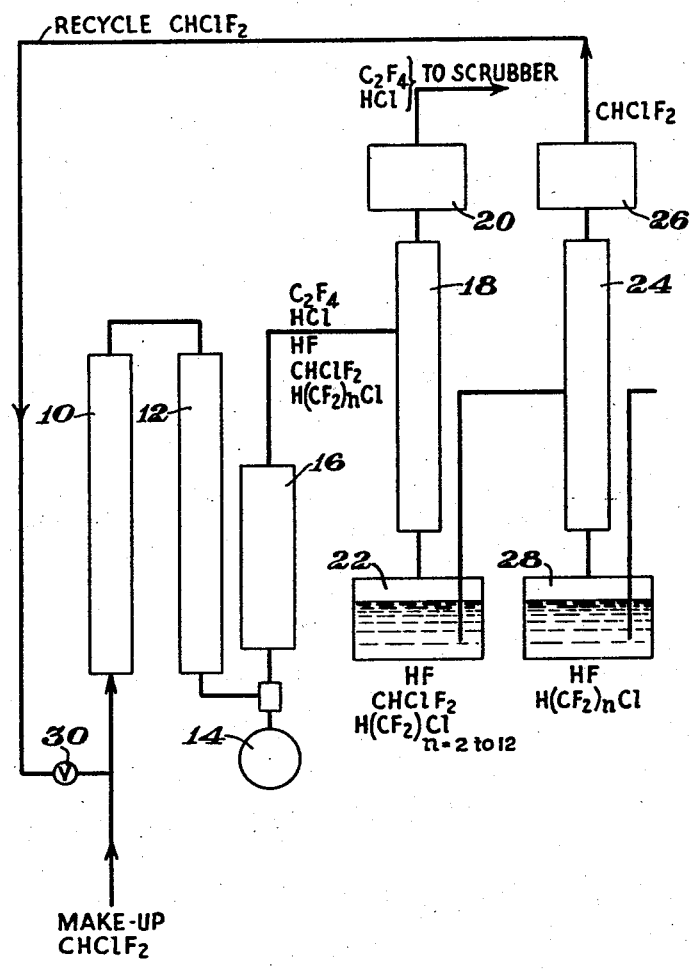

2,406,794

UNITED STATES PATENT OFFICE 2,406,794

PROCESS OF SEPARATING PYROLYSIS PRODUCTS OF CHLORODIFLUOROMETHANE

Anthony F. Benning, Woodstown, and Frederick B. Downing, Carneys Point, N. J., and Joseph D. Park, Wilmington, Del., assignors to Kinetic Chemicals, Inc., Wilmington, Del., a corporation of Delaware Application February 14, 1945, Serial No. 577,871

7 Claims. (Cl. 202—51)

This invention relates to a process, particularly for separating valuable components from the reaction mixture obtained in the pyrolysis of $CHClF_2$.

In the copending application of Downing, Benning and McHarness filed February 11, 1943, as Serial No. 475,526, there is disclosed and claimed a process of pyrolyzing $CHClF_2$ to produce a reaction mixture comprising mainly HCl, $C_2F_4$ and $CHClF_2$ with small proportions of HF and higher boiling products. The separation of the valuable components of such mixture has been attended with considerable difficulty. The usual procedure has been to wash the reaction mixture with water to remove the acidic components, drying and condensing the washed products and then subjecting to fractional distillation to remove the $C_2F_4$. During the pyrolysis, only about 25% of the $CHClF_2$ is converted to $C_2F_4$ so that the reaction mixture contains organic products which comprise about 25 to about 30 mole per cent of $C_2F_4$, about 69 to about 74 mole per cent of $CHClF_2$ and about 1 to about 6 mole per cent of high boiling side reaction products, admixed with HCl in a proportion corresponding substantially to the $CHClF_2$ converted to $C_2F_4$. This requires the use of large size equipment to wash, dry and condense the large amounts of $CHClF_2$ in the reaction mixture. Also, substantial amounts of valuable $CHClF_2$ are lost by solution in the wash water. This procedure further involves the loss of valuable HCl in the form of an aqueous solution contaminated with HF and $CHClF_2$. Furthermore, when it is attempted to fractionally distill the $C_2F_4$ from the washed and dried reaction mixture, there is a tendency for the $C_2F_4$ to polymerize, which polymerization is further catalyzed by oxygen unavoidably present during the distillation.

It is an object of the present invention to provide a process for recovering the valuable components from a reaction mixture obtained by pyrolyzing $CHClF_2$. Another object is to provide a process for separating $C_2F_4$ from the reaction mixture obtained by pyrolyzing $CHClF_2$ and particularly without substantial polymerization of $C_2F_4$. A further object is to provide a process for recovering HCl in a usable form from the reaction mixture obtained by pyrolyzing $CHClF_2$. Other objects are to advance the art. Still other objects will appear hereinafter.

The above and other objects may be accomplished in accordance with our invention which comprises subjecting a reaction mixture, comprising mainly HCl, $C_2F_4$ and $CHClF_2$ and small proportions of HF and higher boiling organic products, to anhydrous fractional distillation under pressures of from about 50 to about 150 pounds per square inch absolute and at temperatures adjusted to distill off HCl and $C_2F_4$ simultaneously in a molar ratio of about 2 to 1 while retaining the rest of the mixture in the still. The mixture, remaining in the still, may then be subjected to a further anhydrous fractional distillation under pressures of from about 45 to about 150 pounds per square inch absolute and at temperatures adjusted to distill off $CHClF_2$ from the rest of the mixture. The mixture of $C_2F_4$ and HCl may be scrubbed with water to obtain substantially pure $C_2F_4$ and and a substantially pure aqueous solution of HCl. Alternatively, if desired, the mixture of $C_2F_4$ and HCl may be subjected to a catalytic addition process to cause them to react to produce $C_2HClF_4$ as more fully described in the copending application of Benning, Downing and Plunkett filed February 18, 1943, as Serial No. 476,332.

We have found that, by such process, we are able to effectively separate the reaction mixture into its valuable components in an easy and economical manner and to largely overcome the objections of the method previously employed. When the $C_2F_4$ is distilled in the presence of about 2 mole proportions of HCl, there is little or no tendency for the $C_2F_4$ to polymerize, even in the presence of substantial amounts of oxygen. Only relatively small amounts of material are subjected to the washing, drying and condensing steps, whereby large economies are effected in the process and in the apparatus employed. Furthermore, the HCl is recovered in a commercially valuable and usable form. There is also substantially complete recovery of unreacted $CHClF_2$ since none is lost by solution in the scrubbing water. It will thus be apparent that by our process, we are able to effectively recover the valuable components of the reaction mixture in a simple and easy manner and to effect large economies in the process and in the apparatus.

In order to more clearly illustrate our invention and the best modes of carrying the same into effect, our invention will be described in more detail with reference to the accompanying drawing which illustrates one form of apparatus, shown somewhat diagrammatically, which may be employed for carrying out our invention.

The apparatus shown in Fig. 1 of the drawing comprises a pyrolysis tube 10, a cooler 12, a compressor 14, a precondenser 16, a reflux column 18 and a dephlegmator 20, all connected in series by suitable conduits. A still pot 22 is connected to the bottom of the reflux column 18. There is also provided a reflux column 24, a dephlegmator 26 and a still pot 28 connected by suitable conduits. A conduit leads from the still pot 22 to the reflux column 24. The dephlegmator 26 is connected to the pyrolysis tube 10 through a suitable conduit and valve 30. The still pot 28 is also provided with an outlet tube for withdrawing still residues therefrom.

In operation, the $CHClF_2$ is passed through the pyrolysis tube 10 and pyrolyzed to produce $C_2F_4$ and other products. The reaction mixture passes from the pyrolysis tube through the cooler 12 where it is cooled to about room temperature. The reaction products then pass to the compressor 14 wherein they are compressed to form about 50 to about 150 pounds per square inch absolute and forced through the precondenser 16 where it is further cooled to about $-20°$ C. and then into the reflux column 18. The mixture entering the reflux column 18 is partially liquid and partially gaseous.

The reflux column 18 and the dephlegmator 20 are operated at temperatures, corresponding to the pressure employed, to distill off the $C_2F_4$ and the HCl simultaneously in a ratio of about 2 moles of HCl to each mole of $C_2F_4$, the temperature and pressure relationship in the dephlegmator being equivalent to the boiling point of such mixture. With pressures of from about 90 to about 100 pounds per square inch absolute, the dephlegmator temperature will be from about $-45°$ C. to about $-50°$ C. We have found these last temperatures and pressures to be the most practical, but higher or lower pressures may be used with the temperatures adjusted accordingly.

The $C_2F_4$ and HCl will pass off from the dephlegmator substantially uncontaminated with other components of the reaction mixture and the other components of the reaction mixture will pass to and be collected in the still pot 22. The mixture of $C_2F_4$ and HCl may be passed to a scrubber, not shown, where the HCl will be removed by scrubbing with water to obtain substantially pure $C_2F_4$ and a substantially pure aqueous solution of HCl.

The residue in the still pot 22 may be discarded. However, for economical operation, it will be preferred to force this still residue, by autogenous pressure, into the reflux column 24. There will be a slight pressure drop so that the reflux column 24 will normally operate at slightly lower pressures than the reflux column 18, e. g. at from about 45 to about 150 pounds per square inch absolute. If desired, a compressor or other means can be included to increase the pressure in the reflux column 24, but this will generally be unnecessary. Preferably, the pressure in the reflux column 24 and dephlegmator 26 will be from about 45 to about 70 pounds per square inch absolute. At these pressures, the temperature in the reflux column will be about 5° C. to about 15° C. and the operating temperature of the dephlegmator will be from about $-5°$ C. to about 0° C. The reflux column 24 and pehlegmator 26 will be operated at a temperature equal to the boiling point of $CHClF_2$, whereby substantially pure $CHClF_2$, contaminated with a slight amount of HF (less than 0.1 mole per cent), will be removed from the dephlegmator 26. The $CHClF_2$ may be recovered, but preferably will be recycled into the pyrolysis tube 10 as shown. If desired, the HF, in the $CHClF_2$, may be removed by passage through a cartridge of calcium chloride or by other suitable means.

The HF and higher boiling organic products will pass to the still pot 28. The residue in the still pot 28 will preferably be allowed to build up until the pot is about half full and the residue drawn off therefrom as necessary to maintain the pot about half full. If all of the still residue were removed from the pot, the still would tend to operate erratically. By maintaining the pot about half full of residue, smoother and better still performance is obtained. The residue from the still pot 28 may be discarded, if desired. Frequently, it will be desirable to treat such residue further as by washing with water to remove the HF and then subjecting the high boilers to fractional distillation.

The apparatus and the operation thereof, as above described, illustrates one type of apparatus for a continuous process. Other types of apparatus may be substituted therefor. Also, the process may be operated batchwise in suitable apparatus therefor. Furthermore, pressures, higher and lower than those disclosed, may be employed with suitable adjustment of the temperatures in accordance with the principles of our invention. Therefore, our invention is not to be limited to the specific embodiments disclosed, but we intend to cover our invention broadly as in the appended claims.

We claim:

1. The process of separating valuable components from a reaction mixture comprising mainly HCl, $C_2F_4$ and $CHClF_2$ and small proportions of HF and higher boiling organic products, of the character of that obtained by pyrolyzing $CHClF_2$, the steps which comprise subjecting the reaction mixture to anhydrous fractional distillation under pressures of from about 50 to about 150 pounds per square inch absolute and at temperatures adjusted to distill off HCl and $C_2F_4$ simultaneously in a molar ratio of about 2 to 1 while retaining the rest of the mixture in the still.

2. The process of separating valuable components from a reaction mixture comprising mainly HCl, $C_2F_4$ and $CHClF_2$ and small proportions of HF and higher boiling organic products, of the character of that obtained by pyrolyzing $CHClF_2$, the steps which comprise subjecting the reaction mixture to anhydrous fractional distillation under pressures of from about 50 to about 150 pounds per square inch absolute and at temperatures adjusted to distill off HCl and $C_2F_4$ simultaneously in a molar ratio of about 2 to 1 while retaining the rest of the mixture in the still, and then subjecting the mixture in the still to further anhydrous fractional distillation under pressures of from about 45 to about 150 pounds per square inch absolute and at temperatures adjusted to distill off the $CHClF_2$ from the rest of the mixture.

3. The process of separating valuable components from a reaction mixture comprising mainly HCl, $C_2F_4$ and $CHClF_2$ and small proportions of HF and higher boiling organic products, of the character of that obtained by pyrolyzing $CHClF_2$, the steps which comprise subjecting the reaction mixture to anhydrous fractional distillation under pressures of from about 50 to about 150 pounds per square inch absolute and at temperatures adjusted to distill off HCl and $C_2F_4$ simultaneously in a molar ratio of about 2 to 1 while retaining the rest of the mixture in the still, and then washing the mixture of HCl and $C_2F_4$ with an aqueous medium to remove the HCl from the $C_2F_4$.

4. The process of separating valuable components from a reaction mixture comprising mainly HCl, $C_2F_4$ and $CHClF_2$ and small proportions of HF and higher boiling organic products, of the character of that obtained by pyrolyzing $CHClF_2$, the steps which comprise subjecting the reaction mixture to anhydrous fractional distillation under pressures of from about 50 to about 150 pounds per square inch absolute and at temperatures adjusted to distill off HCl and $C_2F_4$ simultaneously in a molar ratio of about 2 to 1 while retaining the rest of the mixture in the still, and then washing the mixture of HCl and $C_2F_4$ with a small amount of water to obtain a commercial aqueous solution of HCl and substantially pure $C_2F_4$.

5. The process of separating valuable components from a reaction mixture comprising mainly HCl, $C_2F_4$ and $CHClF_2$ and small proportions of HF and higher boiling organic products, of the character of that obtained by pyrolyzing $CHClF_2$, the steps which comprise subjecting the reaction mixture to anhydrous fractional distillation under pressures of from about 50 to about 150 pounds per square inch absolute and at temperatures adjusted to distill off HCl and $C_2F_4$ simultaneously in a molar ratio of about 2 to 1 while retaining the rest of the mixture in the still, and then subjecting the mixture in the still to further anhydrous fractional distillation under pressures of from about 45 to about 150 pounds per square inch absolute and at temperatures adjusted to distill off the $CHClF_2$ from the rest of the mixture, and recycling the distilled $CHClF_2$ to the pyrolysis operation.

6. The process of separating valuable components from a reaction mixture comprising mainly HCl, $C_2F_4$ and $CHClF_2$ and small proportions of HF and higher boiling organic products, of the character of that obtained by pyrolyzing $CHClF_2$, the steps which comprise subjecting the reaction mixture to anhydrous fractional distillation under pressures of from about 90 to about 100 pounds per square inch absolute and at temperatures of from about $-45°$ C. to about $-50°$ C., to distill off HCl and $C_2F_4$ simultaneously in a molar ratio of about 2 to 1 while retaining the rest of the mixture in the still.

7. The process of separating valuable components from a reaction mixture comprising mainly HCl, $C_2F_4$ and $CHClF_2$ and small proportions of HF and higher boiling products, of the character of that obtained by pyrolyzing $CHClF_2$, the steps which comprise subjecting the reaction mixture to anhydrous fractional distillation under pressures of from about 90 to about 100 pounds per square inch absolute and at temperatures of from about $-45°$ C. to about $-50°$ C., to distill off HCl and $C_2F_4$ simultaneously in a molar ratio of about 2 to 1 while retaining the rest of the mixture in the still, and then subjecting the mixture in the still to further anhydrous fractional distillation under pressures of from about 60 to about 70 pounds per square inch absolute and at temperatures of from about $0°$ C. to about $-5°$ C. to distill off the $CHClF_2$ from the rest of the mixture.

ANTHONY F. BENNING.
FREDERICK B. DOWNING.
JOSEPH D. PARK.